M. A. PETERS.
AUTOMOBILE SIGNAL.
APPLICATION FILED JUNE 22, 1917.
1,277,473.
Patented Sept. 3, 1918.
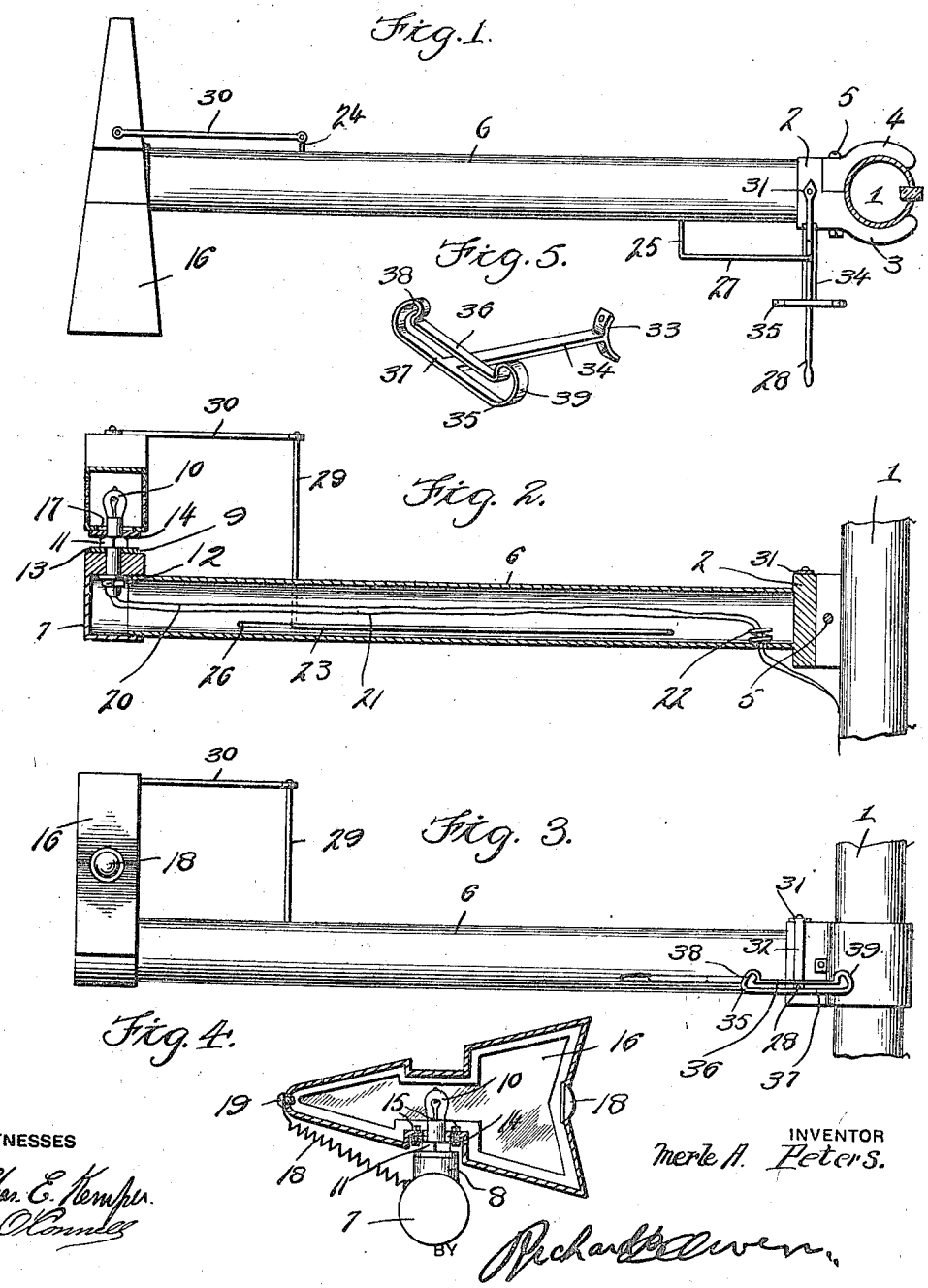
WITNESSES
INVENTOR
Merle A. Peters.
ATTORNEY

UNITED STATES PATENT OFFICE.

MERLE A. PETERS, OF HUNTINGTON, INDIANA.

AUTOMOBILE-SIGNAL.

1,277,473.              Specification of Letters Patent.        Patented Sept. 3, 1918.

Application filed June 22, 1917.   Serial No. 176,446.

*To all whom it may concern:*

Be it known that I, MERLE A. PETERS, a citizen of the United States, residing at Huntington, in the county of Huntington and State of Indiana, have invented certain new and useful Improvements in Automobile-Signals, of which the following is a specification.

This invention relates to certain new and useful improvements in signals and more particularly in signals of the direction indicating type adapted to be carried by vehicles.

The primary object of the invention is to provide a signal which is to be attached to a vehicle and operated by the driver to indicate to pedestrians or other drivers the direction which the vehicle is going to take when making a turn, approaching crossing, etc.

Another object of the invention is to provide a direction indicating signal of the type mentioned which is adapted to be secured to the windshield of a motor vehicle in a convenient position to be operated by the driver.

A further object of the invention is to provide a signal or indicator of the type mentioned, including a supporting arm adapted to be attached to the windshield of a motor vehicle and having an indicating arrow movably secured to one end thereof, and actuating means carried by the arm and adapted to operate the arrow to indicate the direction of travel.

The above and other objects and advantages of this invention will be in part described and in part understood from the following description of the present preferred embodiment, the same being illustrated in the accompanying drawings in which, Figure 1 is a top plan view.

Fig. 2 is a vertical longitudinal sectional view.

Fig. 3 is a rear view.

Fig. 4 is a sectional view of the arrow casing, and

Fig. 5 is a view of one of the details.

It is to be understood that my invention is capable of general application but in the present drawings I have shown the same as applied to the windshield of a motor vehicle. In these drawings, the numeral 1 designates the frame of a windshield and 2 a clamp associated therewith. The clamp 2 comprises a stationary jaw 3 and a movable jaw 4, which jaws are adapted to embrace the frame of the windshield as shown, and are held in clamping engagement therewith by means of a bolt 5. Formed integral with or connected in any suitable way to the clamp 2 and extending outwardly from the frame 1 is a hollow tubular arm 6. The outer open end of the arm 6 is closed by means of a threaded cap 7 provided on its periphery with an upwardly extending circular boss or projection 8. This projection 8 is provided with a vertical opening to receive a socket or stem 9 carrying at its upper end an electric bulb 10. The socket or stem 9 is fastened in position by the nuts 11 and 12 secured thereto, and engaging the upper and lower surfaces respectively of the projection 8. If desired washers 13 may be interposed between nuts 11 and 12 and the surfaces of the member 8.

Supported on the nut 11 is a plate 14 which is provided with a central opening through which the upper end of the stem 9 and the bulb 10 project. Rotatably supported on the plate 14 and secured thereto by means of the bolts 15 is an arrow shaped casing 16 which is provided with an opening 17 to receive the electric bulb 10. A coil spring, indicated at 18, has one terminal thereof connected to the cap 7 and the opposite terminal secured by means of a screw 19 to the point of the arrow shaped casing 16. As shown, the arrow shaped casing 16 is rotatably supported on the nut 11 by means of the plate 14 and is adapted to point either to the left or right to indicate the direction of travel of the vehicle to which it is attached. The spring 18 is adapted to be placed under tension when the arrow is turned to either side and automatically returns the same to its normal position parallel with the side of the vehicle.

In constructing the arrow shaped casing, the top, bottom and end walls are preferably made in the form of a metal frame, but the side walls of the casing are to be made of glass or other transparent material and are adapted to be fastened to the frame in any suitable way. As shown, the arrow is of a tapering construction and in the rear end thereof is provided with a lens or "bull's eye" which when the arrow is pointed straight ahead and illuminated will inform those behind that the vehicle is continuing straight ahead.

Connected to the lower end of the stem 9 and passing through the arm 8 are the electric wires 20 and 21 which carry the current to the bulb 10. These wires are carried through the arm 6 and are led out through an opening formed in the arm adjacent the clamp 2. From thence the wires may be carried along the frame of the windshield and beneath the floor of the car in any suitable manner to be finally connected in circuit with the tail lamps. 22 is a spring which is fastened at the opening through which the wires pass out of the arm 6 and serves to hold the wires in spaced relation with the walls of said arm.

To operate the arrow, I provide a rod 23 which is positioned in the arm 6 and has its oppositely turned angular ends 24 and 25 respectively operating in slots 26 formed in the said arm. The end 25 is again bent at right angles to extend parallel with the arm 6 as indicated at 27 and is adapted to be connected to the lever 28. The other end 24 of the rod, is bent to provide a vertical arm 29 which is operatively connected to the arrow casing 16 by means of a link 30 as shown. The lever 28 is pivotally secured to the clamp 2 as indicated at 31 and is bent downwardly as indicated at 32 and extended outwardly therefrom. Also secured to the clamp 2 by means of its curved end 33 is a bar 34 equipped at its opposite end with a guide loop 35 in which the lever is adapted to operate. The guide loop 35 consists of upper and lower bars 36 and 37 which are placed apart a sufficient distance to allow the lever to move back and forth therebetween and are connected together at their opposite ends. The bar 36 is bent upwardly at its opposite end to provide pockets 38 and 39.

In operating the device, when the vehicle is to be turned to the left the lever 28 is pushed to the left and forces the rod 23 in a like direction, thus causing the arm 29 and the link 30 to turn the arrow toward the left to indicate the proposed direction of travel. The arrow may be locked in this position by raising the lever and engaging the same in the pocket 38. When going in the opposite direction, the operation is merely reversed; the lever being pushed to the right and engaged with the pocket 39 and through its connection with the arrow causes the latter to also turn to the right. As soon as the lever is disengaged from either pocket, the spring 28 automatically returns the arrow and lever to normal position.

Although I have described the preferred embodiment of my invention it is to be understood that I do not limit myself to the exact construction and arrangement of the same, but reserve right to make such changes as are desired, provided of course that the proposed changes come within the scope of the appended claims without departing from the spirit of the invention.

I claim:—

1. A direction indicator for vehicles, including a supporting arm, a clamp attached to one end of said arm and adapted to be attached to a vehicle, an arrow movably connected to the opposite end of said arm, a lever pivotally connected to said clamp, and an operating rod slidably mounted in said arm, said rod having one end connected to said arrow and the opposite end connected to said lever.

2. The combination with the windshield of a vehicle, of a direction indicator including a clamp connected to said windshield, a tubular arm connected to said clamp, an arrow movably connected to the outer end of said arm, said arm having slots formed in opposite sides thereof, an operating rod positioned in said arm and having oppositely turned ends adapted to operate in said slots, a vertical arm formed on one of said ends, a link having one end secured to said arm and the opposite end connected to said arrow, and a lever pivotally secured to said clamp and adapted to be secured to the opposite end of said rod.

3. The combination with the windshield of a vehicle, of a direction indicator including a clamp attached to said windshield, an outwardly extending tubular arm connected to said clamp, a lever pivotally secured to said clamp, a cap closing the outer end of said arm, a projection formed on the periphery of said cap and provided with a vertical opening, a stem positioned in said opening and provided at its upper end with an electric bulb, electric wires connected to said stem, nuts secured to said stem and engaging the upper and lower surfaces of said projection, a plate rotatably mounted on the uppermost of said nuts, an arrow shaped casing adapted to be secured to said plate and provided with an opening to receive said electric bulb, a spring having one end connected to said casing and its opposite end connected to said cap, and an operating rod slidably mounted in said arm and having one end thereof connected to said casing and the opposite end connected to said lever.

4. The combination with the windshield of a vehicle, of a direction indicator including a clamp connected to said windshield, a hollow tubular arm connected to said clamp and extending outwardly therefrom, a lever connected to said arm, a cap closing the outer end of the arm, a projection formed on said cap and provided with a vertical opening, an electric bulb having a stem adapted to be received in said opening, a plate rotatably supported on said stem, an arrow shaped casing adapted to be secured to said plate and provided with an opening to receive said bulb, an operating rod slidably mounted in said arm and having one end thereof connected to said lever, and means for connecting the opposite ends of said rod to said casing.

5. The combination with the windshield of a vehicle, of a direction indicator including a clamp adapted to be connected to the windshield, an outwardly extending tubular arm connected to said clamp, a lever connected to said clamp, a cap closing the outer end of said arm, an arrow shaped casing pivotally secured to said cap, means for illuminating said casing, a spring having one end connected to said casing and the opposite end connected to said cap, an operating rod slidably mounted in said arm one end of said rod being connected to said lever, a vertical arm formed on the opposite end of said rod and a link having one end connected to said arm and the opposite end connected to said casing.

6. The combination with a vehicle windshield of a direction indicator including a clamp adapted to be connected to the windshield, a tubular arm extending outwardly from said clamp an arrow shaped casing pivotally secured to the outer end of said arm, a lever connected to said clamp, a rod operating in said arm and having one end connected to said lever, the opposite end of said rod being connected to said arrow casing, a bar secured to said clamp and having a loop formed on its outer end to receive said lever, said loop provided with means for locking the lever at either end thereof.

7. A direction indicator, comprising a tubular arm provided with side slots near each end thereof and closed at one end, a clamp formed on said closed end, a cap closing the opposite open end of the arm, an indicator rotatably mounted on said cap, a lever pivotally secured to said clamp, and an operating rod reciprocating within said arm and having its opposite ends extended through said side slots, one of said ends being operatively connected with said indicator and the opposite end with said lever.

In testimony whereof I affix my signature in presence of two witnesses.

MERLE A. PETERS.

Witnesses:
BRUCE F. WALLACE,
PAUL S. NICHEY.

Copies of this patent may be obtained for five cents each, by addressing the "Commissioner of Patents, Washington, D. C."